(12) United States Patent
Chan et al.

(10) Patent No.: US 12,072,840 B2
(45) Date of Patent: *Aug. 27, 2024

(54) CATALOG QUERY FRAMEWORK ON DISTRIBUTED KEY VALUE STORE

(71) Applicant: Snowflake Inc., Bozeman, MT (US)

(72) Inventors: Lin Chan, Bellevue, WA (US); Tianyi Chen, Kirkland, WA (US); Robert Bengt Benedikt Gernhardt, Seattle, WA (US); Nithin Mahesh, Kirkland, WA (US); Eric Robinson, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/179,793

(22) Filed: Mar. 7, 2023

(65) Prior Publication Data

US 2023/0205735 A1 Jun. 29, 2023

Related U.S. Application Data

(63) Continuation of application No. 17/809,829, filed on Jun. 29, 2022, now Pat. No. 11,645,232, which is a continuation of application No. 17/514,227, filed on Oct. 29, 2021, now Pat. No. 11,403,259.

(51) Int. Cl.
*G06F 15/16* (2006.01)
*G06F 16/14* (2019.01)
*G06F 16/16* (2019.01)

(52) U.S. Cl.
CPC .......... *G06F 16/148* (2019.01); *G06F 16/164* (2019.01)

(58) Field of Classification Search
None
See application file for complete search history.

(56) References Cited

U.S. PATENT DOCUMENTS

| | | |
|---|---|---|
| 8,260,769 B1 | 9/2012 | Fuller |
| 9,418,088 B1 | 8/2016 | Noll |
| 10,990,611 B1 | 4/2021 | Singh et al. |
| 11,403,259 B1 | 8/2022 | Chan et al. |
| 11,645,232 B1 | 5/2023 | Chan et al. |
| 2009/0193050 A1 | 7/2009 | Olson |
| 2010/0262633 A1 | 10/2010 | Bhattacharjee et al. |
| 2012/0047332 A1 | 2/2012 | Bannon et al. |
| 2013/0091331 A1 | 4/2013 | Moraru et al. |
| 2016/0154865 A1 | 6/2016 | Daniel et al. |
| 2018/0357274 A1 | 12/2018 | Vishal |

(Continued)

OTHER PUBLICATIONS

"U.S. Appl. No. 17/809,829, PTO Response to Rule 312 Communication mailed Mar. 15, 2023", 2 pages.

(Continued)

*Primary Examiner* — Alex Gofman
(74) *Attorney, Agent, or Firm* — Schwegman Lundberg & Woessner, P.A.

(57) ABSTRACT

Techniques for executing show commands are described herein. A plurality of navigation steps is utilized, each navigation step corresponding to a different layer in a database structure and each navigation step including an operator to fetch items from a metadata database up to respective bounded limits. Dependency information is also fetched for objects of the specified object type in the show command. After a set of objects from the last layer are processed, memory for the navigation steps is flushed and the next set of objects are processed.

21 Claims, 9 Drawing Sheets

(56) References Cited

U.S. PATENT DOCUMENTS

2019/0087600 A1   3/2019   Sion et al.
2020/0409780 A1   12/2020  Balasubramanian et al.
2023/0138110 A1   5/2023   Chan et al.

OTHER PUBLICATIONS

"U.S. Appl. No. 17/514,227, Non Final Office Action mailed Jan. 4, 2022", 12 pgs.
"U.S. Appl. No. 17/514,227, Notice of Allowance mailed Apr. 14, 2022", 9 pgs.
"U.S. Appl. No. 17/514,227, Response filed Mar. 31, 2022 to Non Final Office Action mailed Jan. 4, 2022", 11 pgs.
"U.S. Appl. No. 17/809,829, 312 Amendment filed Feb. 27, 2023", 6 pgs.
"U.S. Appl. No. 17/809,829, Non Final Office Action mailed Aug. 15, 2022", 13 pgs.
"U.S. Appl. No. 17/809,829, Notice of Allowance mailed Dec. 8, 2022", 9 pgs.
"U.S. Appl. No. 17/809,829, Response filed Nov. 15, 2022 to Non Final Office Action mailed Aug. 15, 2022", 11 pgs.

| Name | Database Name | Schema Name | Search Index | Last Modified |
|------|---------------|-------------|--------------|---------------|
| XX | XX | XX | XX | XX |
| XX | XX | XX | XX | XX |
| XX | XX | XX | XX | XX |
| XX | XX | XX | XX | XX |
| XX | XX | XX | XX | XX |
| XX | XX | XX | XX | XX |
| XX | XX | XX | XX | XX |
| ... | ... | ... | ... | ... |

FIG. 7

CATALOG QUERY FRAMEWORK ON DISTRIBUTED KEY VALUE STORE

CROSS-REFERENCE TO RELATED APPLICATIONS

This application is a Continuation of U.S. patent application Ser. No. 17/809,829, filed Jun. 29, 2022, which is a Continuation of U.S. patent application Ser. No. 17/514,227, filed Oct. 29, 2021 and now issued as U.S. Pat. No. 11,403,259; the contents of which are incorporated herein by reference in their entireties.

TECHNICAL FIELD

The present disclosure generally relates databases and more particularly to efficiently processing show commands related to databases.

BACKGROUND

Show commands can be used to display metadata information about database objects. However, most database systems do not provide structured frameworks for executing show commands. As such, processing show commands for large amounts of data can be slow due to inefficient use of memory. This may lead to deteriorating performance and system crashes.

BRIEF DESCRIPTION OF THE DRAWINGS

Various ones of the appended drawings merely illustrate example embodiments of the present disclosure and should not be considered as limiting its scope.

FIG. 7 illustrates an example of an output table in response to a show command, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are embodiments of frameworks to efficiently process show commands. The frameworks can include a navigation phase and a dependency fetching phase. The navigation phase can be configured in a stepwise fashion where each step corresponds to a different layer in the database structure. Each step may have a bounded memory limit, such that the navigation does not overwhelm memory use. The framework allows developers and users to configure dependency fetching elements for the information to be included in the output of different show commands. A result dependency manager can set up transactions with a metadata store to efficiently process dependency fetching. Moreover, different metrics can be tracked during execution of show commands to identify possible issues and bottleneck areas.

Figure 1:
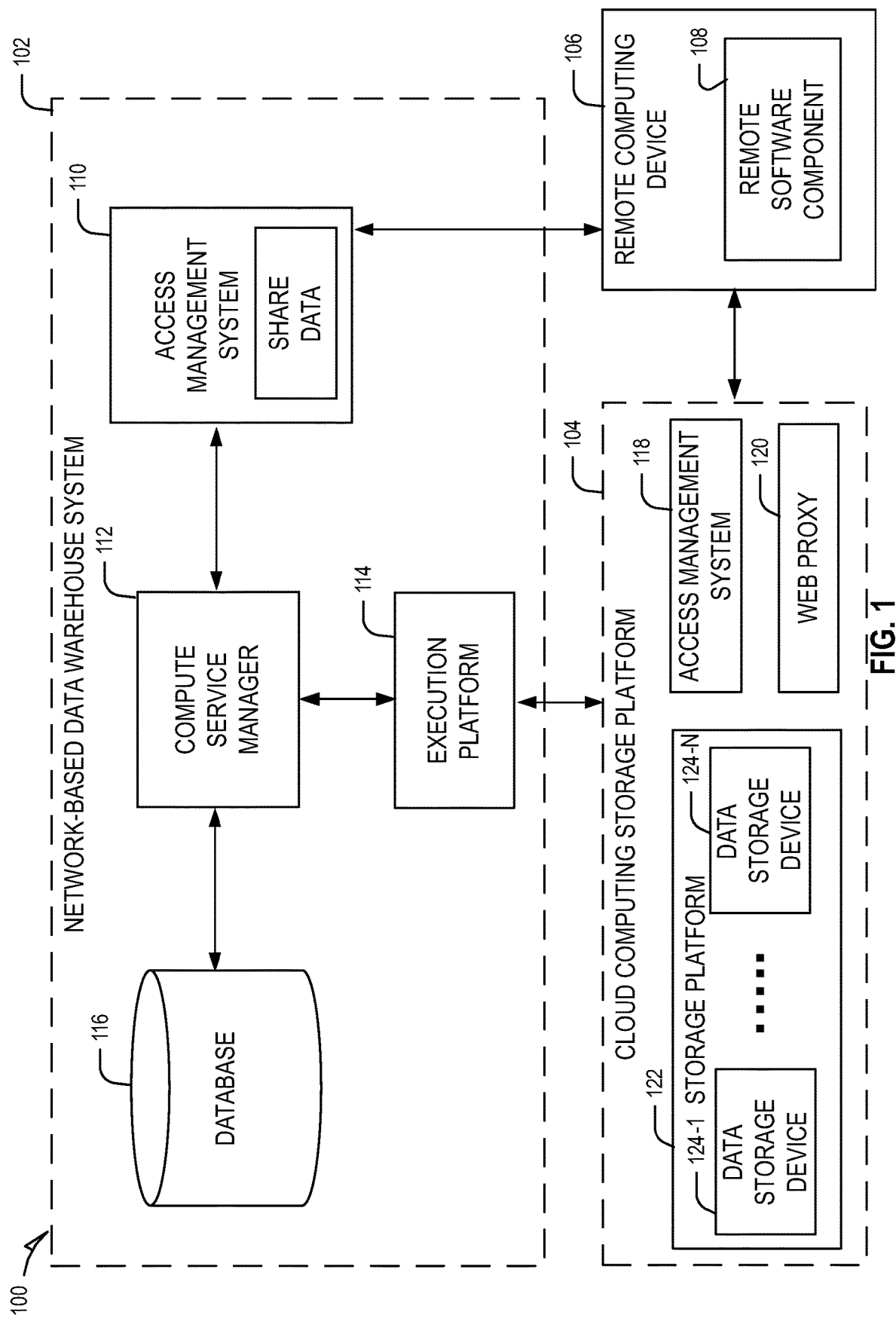
FIG. 1 illustrates an example computing environment in which a cloud database system, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
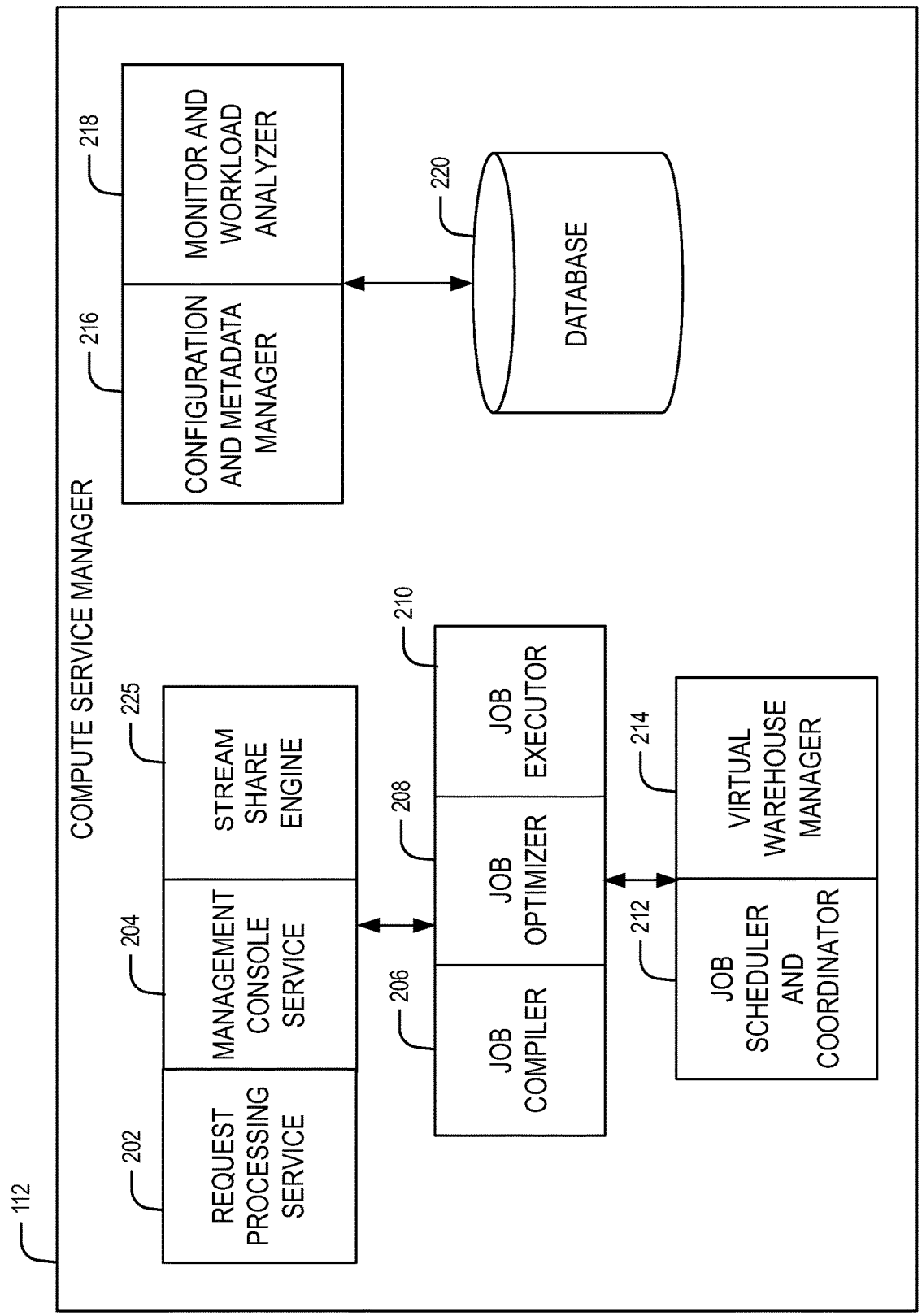
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
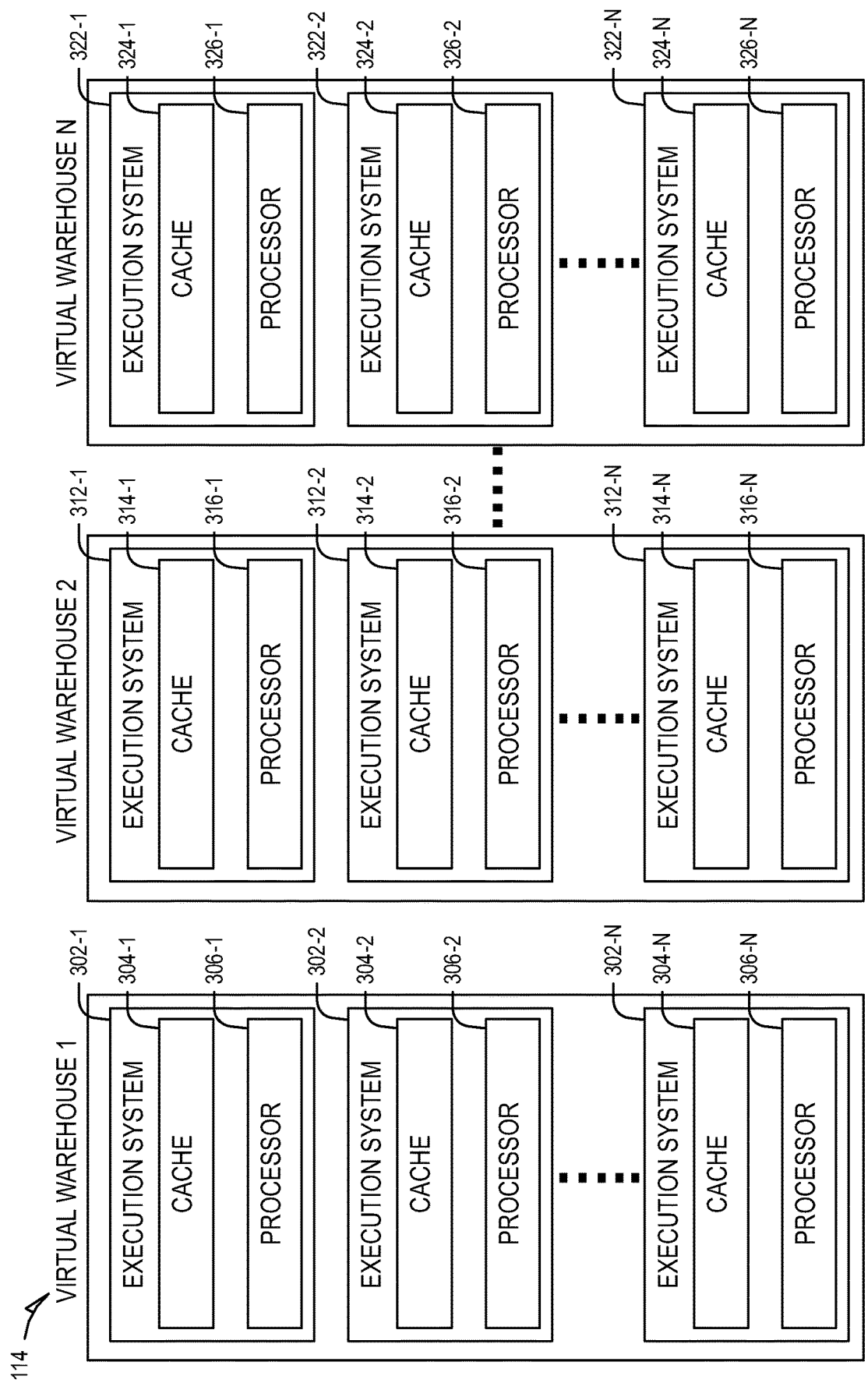
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and N are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

As described herein, large amounts of data may be stored in the database system. Thus, users may wish to obtain information regarding the data, e.g., metadata. One technique to obtain stored metadata is to use a show command, which is an external interface to query metadata. A show command is a DDL command that lists existing objects for the specified object type. Examples of show command include "show tables," "show schemas," "show views," etc. The output of a show command includes metadata for the specified object type. This metadata is typically stored in a metadata store (also referred to as metadata database herein).

Figure 4:
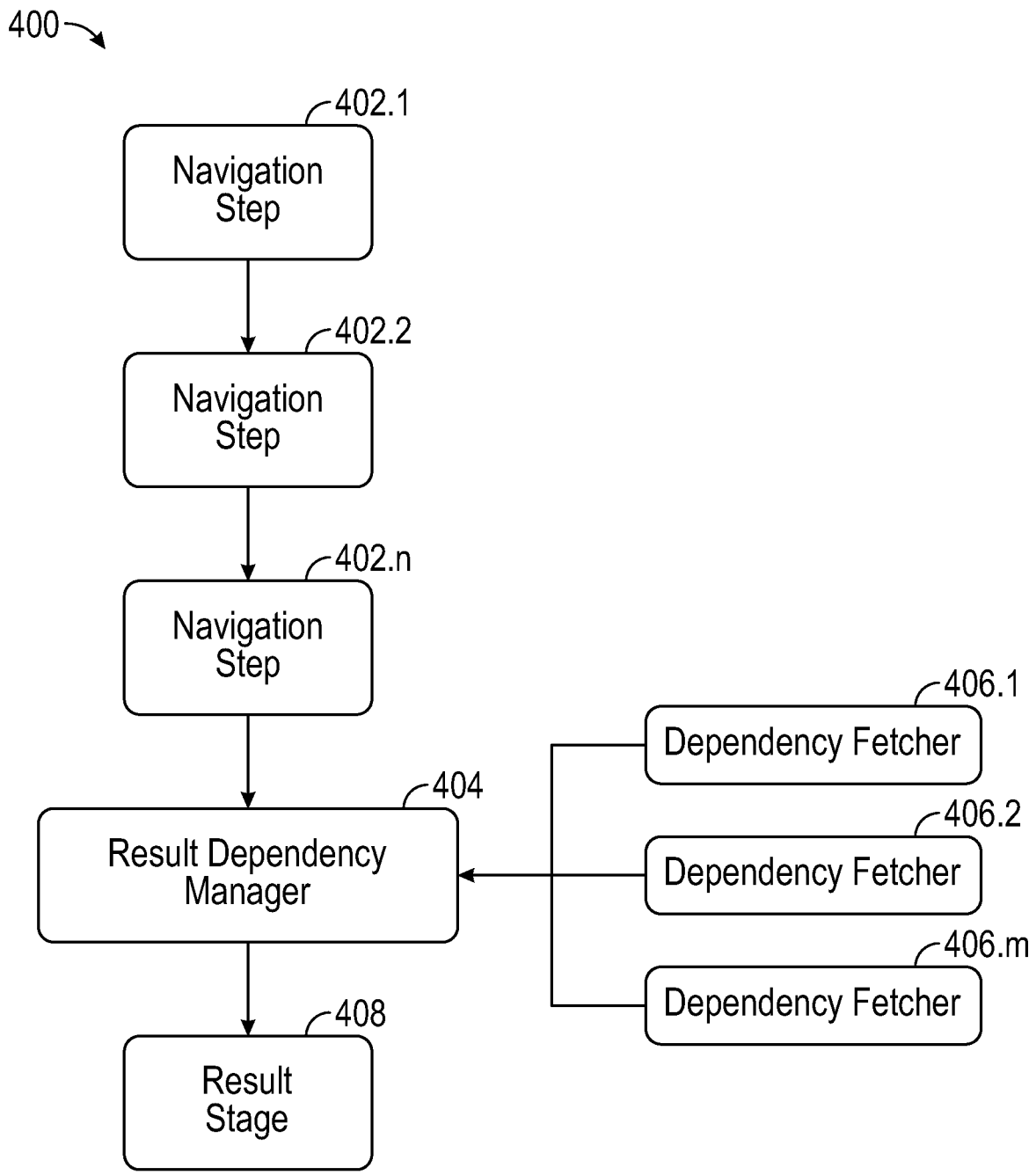
FIG. 4 illustrates a high-level block diagram of a framework to execute show commands, according to some example embodiments.

FIG. 4 illustrates a high-level block diagram of a framework 400 to execute show commands, according to some embodiments. The framework 400 includes two phases: a navigation phase and a result-dependency fetching phase. The navigation phase may include navigation steps 402.1-402.n, and the result-dependency fetching phase may include a result dependency manager 404 and dependency fetcher elements 406.1-406.m.

The navigation phase corresponds to the steps taken to find entities for the specified object type in the relevant domain given the starting source. In framework 400, the navigation phase is provided in a stepwise fashion where each step in the navigation phase has a memory limit. The navigation is broken down in multiple steps so that after certain step(s), the memory being used can be flushed and the next set of steps can be performed with the freed-up memory.

The framework 400 may include multiple layer navigations steps 402.1-402.n, where navigation step 402.1 corresponds to a first navigation layer and 402.n corresponds to the last navigation layer. The navigation steps are defined by the specified object type in the show command. Let's consider the example of "show tables in account." Here, there will be three navigation layers: database(s) to schema(s) to table(s). Hence, the first navigation step 402.1 would correspond to databases such as db1, db2, db3, etc.; the second navigation step 402.2 would correspond to schemas for each database such as schema1, schema2, schema3, etc.; and the third navigation step 402.3 would correspond to tables in each schema such as table1, table2, table3, etc.

The framework 400 takes control of the navigation by providing the navigation operators representing the navigation of a specific object type. Operators may be chained to become a navigation path. During runtime, each operator can fetch dpos (data persistent objects) to a predefined limit (e.g., memory limit) and yield fetching to other operators when that limit is reached. This allows dpo fetching to be scoped at each layer or level. A dpo can be a memory representation of metadata about an object (e.g., a database can have a dpo associated with it, a schema can have a dpo associated with it, a table can have a dpo associated with it, etc.).

Let's consider the example of "show tables," again. As discussed above, there are three layers: databases to schemas to tables. Now, consider a different variation of "show tables" in database X, a particular database. Here, there are two layers to expand under database X: schemas and tables. Two operators may be created, and each would be allocated a bounded dpo count to fetch. The table operator can fetch up to a bounded limit (e.g., 10$k$ tables) at a time, and the schema operator can fetch up to a bounded limit (e.g., 10$k$ schemas) at a time. In some embodiments, the bounded limit for the steps may be different.

During the show command execution, the schema operator would fetch the first 10$k$ schemas, and then yield the fetching to the table operator to start fetching under the loaded tables. When the table operator finishes loading the tables (e.g., 10$k$ tables), it can flush the results to a result stage (after the result dependency fetching phase as described in further detail below) and free up the memory. After all tables under the first 10$k$ schemas are scanned and flushed, the schema operator can fetch the next 10$k$ schemas and yield fetching to the table operator to start fetching the tables under the newly fetched schemas 10$k$ at a time. This process may continue until all tables under all schemas of database X are scanned and flushed, or until a total result limit has been reached and the show command execution has been stopped.

Figure 5:
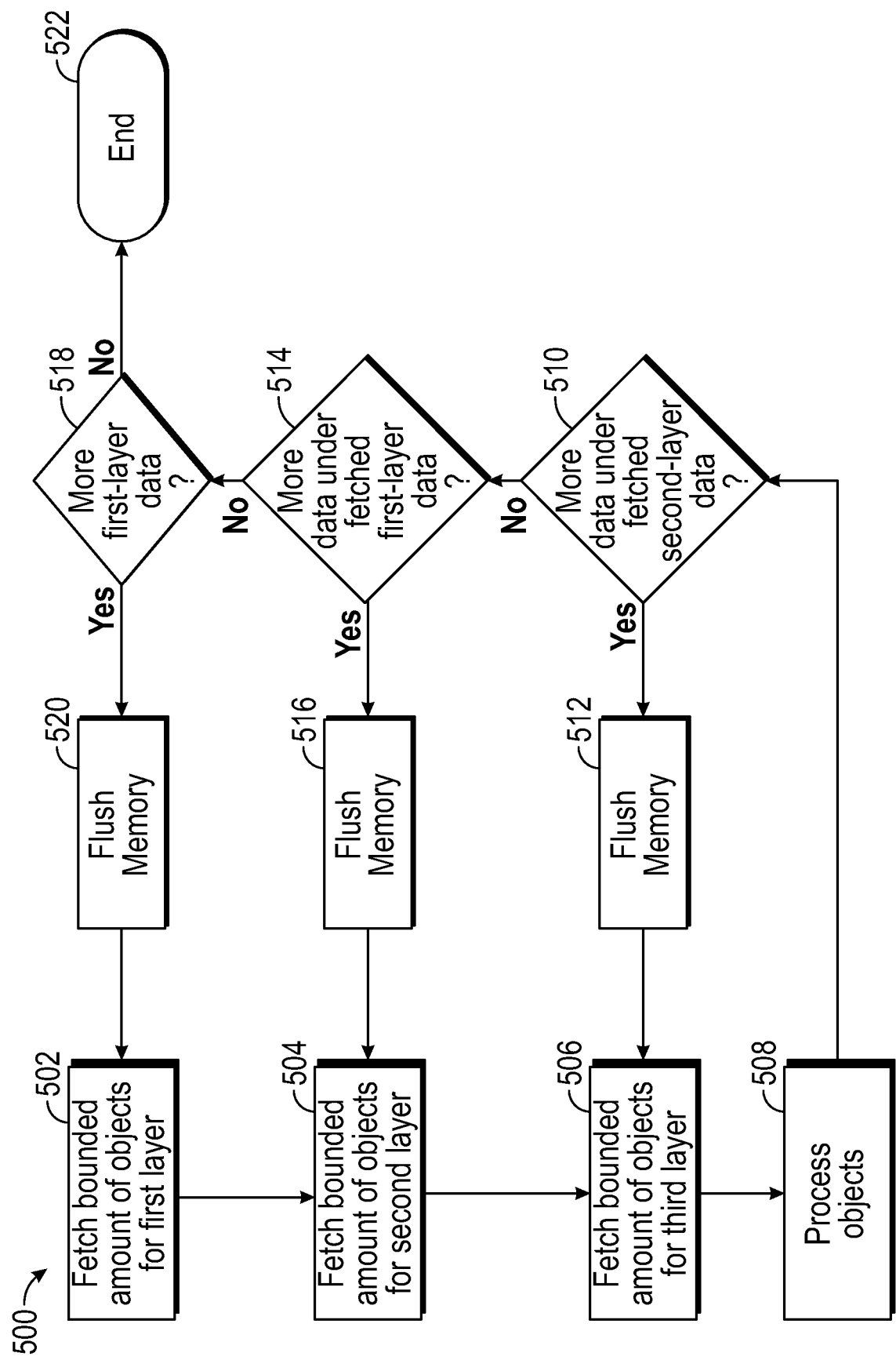
FIG. 5 illustrates a flow diagram for a method for processing a navigation phase in execution of a show command, according to some example embodiments.

FIG. 5 illustrates a flow diagram for a method 500 for processing a navigation phase in execution of a show command, according to some example embodiments. In this example, three layers are described for illustration purposes only, and other numbers of layers may be involved in execution of a show command. The number of layers depends on the specified object type of the respective show command.

At operation 502, the system (e.g., global service (GS), compute service manager 112) may fetch a bounded amount of dpos for the first layer (e.g., 10$k$ databases). At operation 504, the system may fetch a bounded amount of dpos for the second layer corresponding to the fetched results of the first layer (e.g., 10$k$ schemas under the fetched 10$k$ databases). At operation 506, the system may fetch a bounded amount of dpos for the third or last layer corresponding to the fetched results of the second layer (e.g., 10$k$ tables under the fetched 10$k$ schemas).

At operation 508, the system may process the fetched dpos of the last layer (e.g., 10$k$ tables). The processing can involve fetching result dependencies and outputting the results to a remote result stage as described in further detail below.

At operation 510, the system may check if there is any more third-layer data under the fetched second layer (e.g., are there any more tables to be processed under the fetched 10$k$ schemas?). If the answer is yes, there is more data (e.g., tables) under the fetched second layer, the system may flush the memory and delete the previously fetched data of the first layer at operation 512 and then return to operation 506 and may fetch the next set of data for the third layer.

If the answer to operation 510 is no, the system, at operation 514, may check if there is any more second-layer data under the fetched first layer (e.g., are there any more schemas to be processed under the fetched 10$k$ databases?). If the answer is yes, there is more data (e.g., schemas) under the fetched first layer, the system may flush the memory and delete the previously fetched data for the second layer at operation 516 and then return to operation 504 and may fetch the next set of data for the second layer.

If the answer to operation 514 is no, the system, at operation 518, may check if there is any more data for the first layer (e.g., are there any more databases?). If the answer is yes, there is more data (e.g., databases) associated with first layer, the system may flush the memory and delete the previously fetched data for the first layer at operation 520 and then return to operation 502 and may fetch the next set of data for the first layer.

If the answer to operation 518 is no, then all data for the show command has been processed and the method 500 may end (operation 522).

In this example, method 500 continued until all data for the show command was processed, but in some embodiments, there may be a total result limit set for the execution of the show command and the method 500 may end when that limit is reached. In that case, bookmarks may be used to designate where the show command was stopped (e.g., the show command was stopped after processing db3, schema5, table10). Hence, with the use of bookmarks, the user may execute another show command to continue the search where the previous search ended.

Moreover, each navigation step may employ concurrent point lookup to further optimize the use of resources. That is, each navigation step may perform a range scan to determine the relationship between layers (e.g., db to schema), and then, instead of performing individual point lookups of the dpos, the system may perform lookups in each navigation step by sending the requests concurrently to further optimize resource usage.

Referring back to FIG. 4, the result dependency fetching phase of the framework 400 may include the result dependency manager 404 and the plurality of dependency fetcher elements 406.1-406.$m$. The result dependency manager 404 may receive the data from the last layer of the navigation step 402.$n$. The result dependency manager 404 may then, in conjunction with the dependency fetcher elements 406.1-406.$m$, fetch extra dependency information from the metadata store and compile the results. The results may then be output to a result stage 408 for the user. The result stage 408 may be remote from the framework 400.

Different and diverse options may be provided for which dependency information is outputted and the options may be related to the specified object type in the show command. The dependency fetcher elements 406.1-406.$m$ may be configurable by developers/users. That is, developers/users may configure which dependency information is to be included in respective show commands.

However, the result dependency manager 404 may control the interaction of the dependency fetcher elements 406.1-406.$m$ and the metadata store. That is, the result dependency manager 404 may control the lifecycle of transactions with the metadata store (also referred to as DB transactions). In some embodiments, each show command may include one DB transaction with bulk reads so dependency information is fetched concurrently (not one-by-one using individual point lookups). In some embodiments, each dependency fetcher element 406.1-406.*m* may be associated with a respective DB transaction and may fetch relevant dependency information using bulk reads in the respective DB transaction. The result dependency manager 404 may receive the dependency information from the dependency fetcher elements 406.1-406.*m* and may populate the results with the dependency information.

Figure 6:
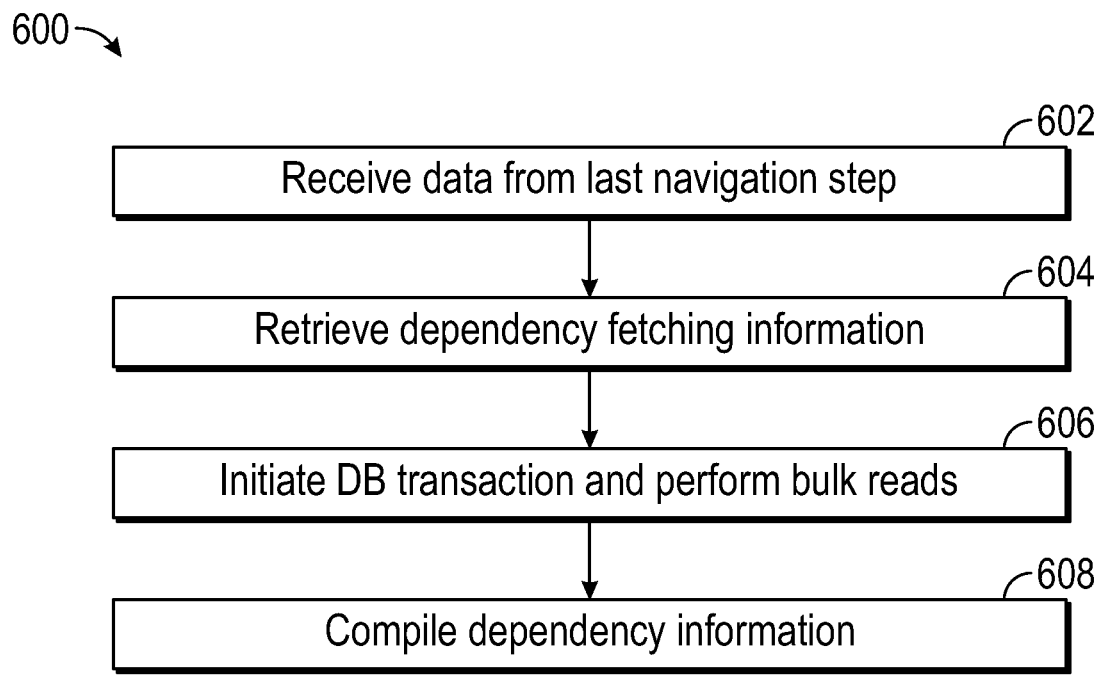
FIG. 6 illustrates a flow diagram for a method for fetching dependency information, according to some example embodiments.

FIG. 6 illustrates a flow diagram for a method 600 for fetching dependency information, according to some example embodiments. At operation 602, the system may receive the data from the last layer of the navigation step (e.g., table data for a show table command). At operation 604, the system may also retrieve dependency fetching information; the type of dependency information may be preconfigured by the developer/user. For example, a developer/user may indicate that for a show tables command, the following dependency information should be obtained: search index information, last modified information, parameter information.

At operation 606, the system may initiate a DB transaction corresponding to the show command that is being executed. Using the DB transaction, the system may perform bulk reads to fetch the dependency information designated by the developer/user.

At operation 608, the system may compile the dependency information and may arrange the information in a table for presentation to the user.

FIG. 7 illustrates an example of an output table 700 in response to a show command, according to some embodiments. In this example, the output table 700 corresponds to the output of a "show tables" command. Here, output table 700 may include columns for different properties and metadata. The information in the columns may be classified in two groups. A first group of columns 702 may include information retrieved directly from the objects that are subject of the show command. In the show tables command, this group of columns 702 may include name, database name, schema name, etc. A second group of columns 704 may include information fetched from dependency information associated with the objects that are subject of the show command. This second group of columns 704 may include information such as search optimization information (e.g., search index), last modified, etc. For example, this dependency information may be populated by the result dependency manager as described above. The number and type of columns in the output table 700 may be configurable. Based on the columns set for the output table 700, the result dependency fetcher elements may be configured to obtain the relevant information.

Figure 8:
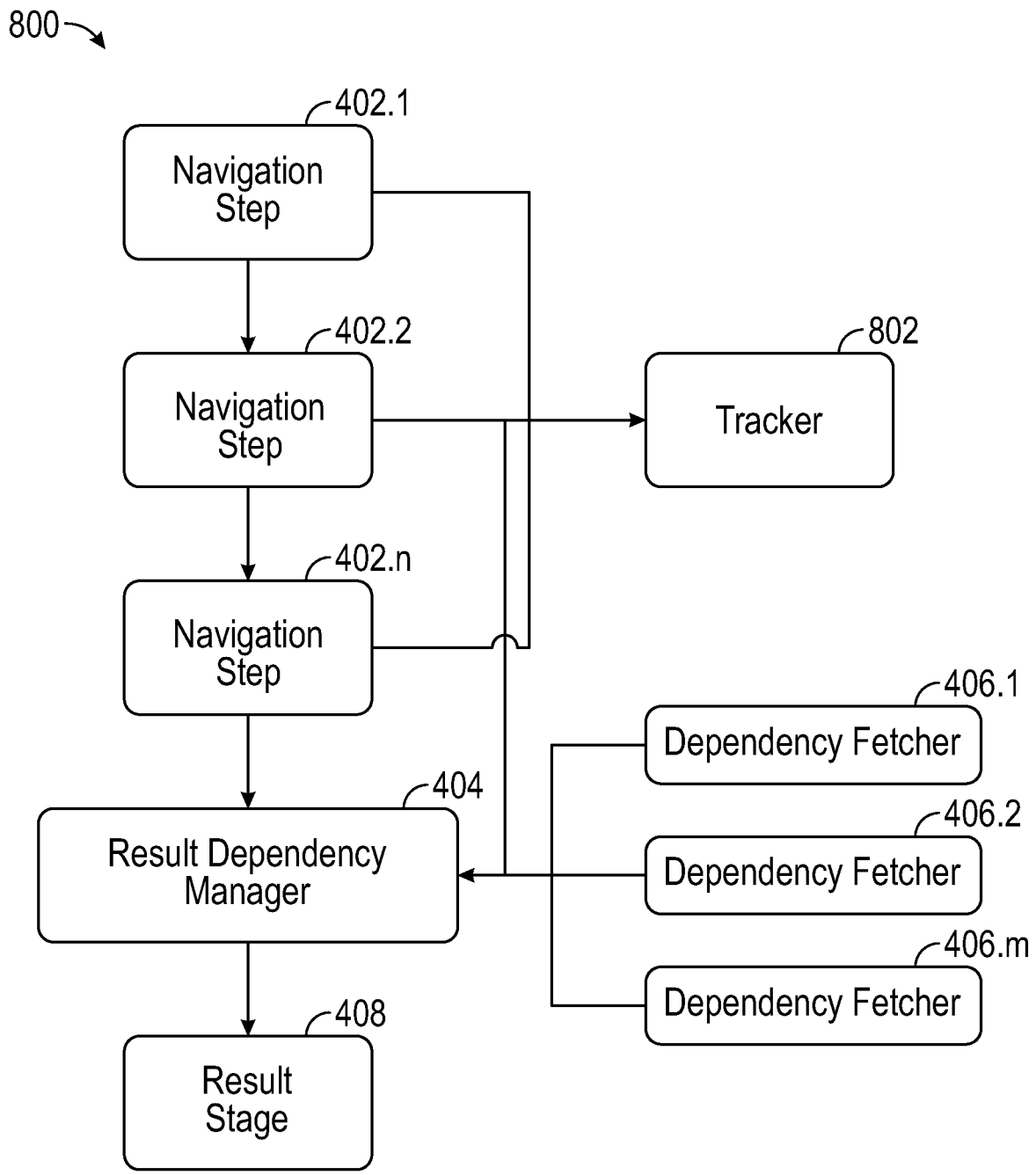
FIG. 8 illustrates a high-level block diagram of a framework to execute show commands with metric tracking, according to some example embodiments.

FIG. 8 illustrates a high-level block diagram of a framework 800 to execute show commands with metric tracking, according to some embodiments. In addition to the navigation phase (e.g., navigation steps 402.1-402.*n*) and the result dependency fetching phase (e.g., result dependency manager 404 and dependency fetcher elements 406.1-406.*m*), which are described above, framework 800 includes metrics tracking with tracker 802. Tracker 802 may be provided as a centralized metrics collector. Tracker 802 may receive performance metrics from different components in framework 800 to identify performance issues, such as bottlenecks at operator levels. For example, the navigation steps 402.1-402.*n* may report time spent at each step and the number of dpos fetched at each step to the tracker 802. Thus, bottlenecks at different navigation steps may be identified. The navigation steps 402.1-402.*n* may also report metrics related to other activities such as security checks. For example, time spent on a security check may be reported. Moreover, the number of items before and after a security check may also be reported. Likewise, result dependency manager 404 and dependency fetcher elements 406.1-406.*m* may also report metrics related to result dependency fetching such as the processing time to fetch certain information.

Figure 9:
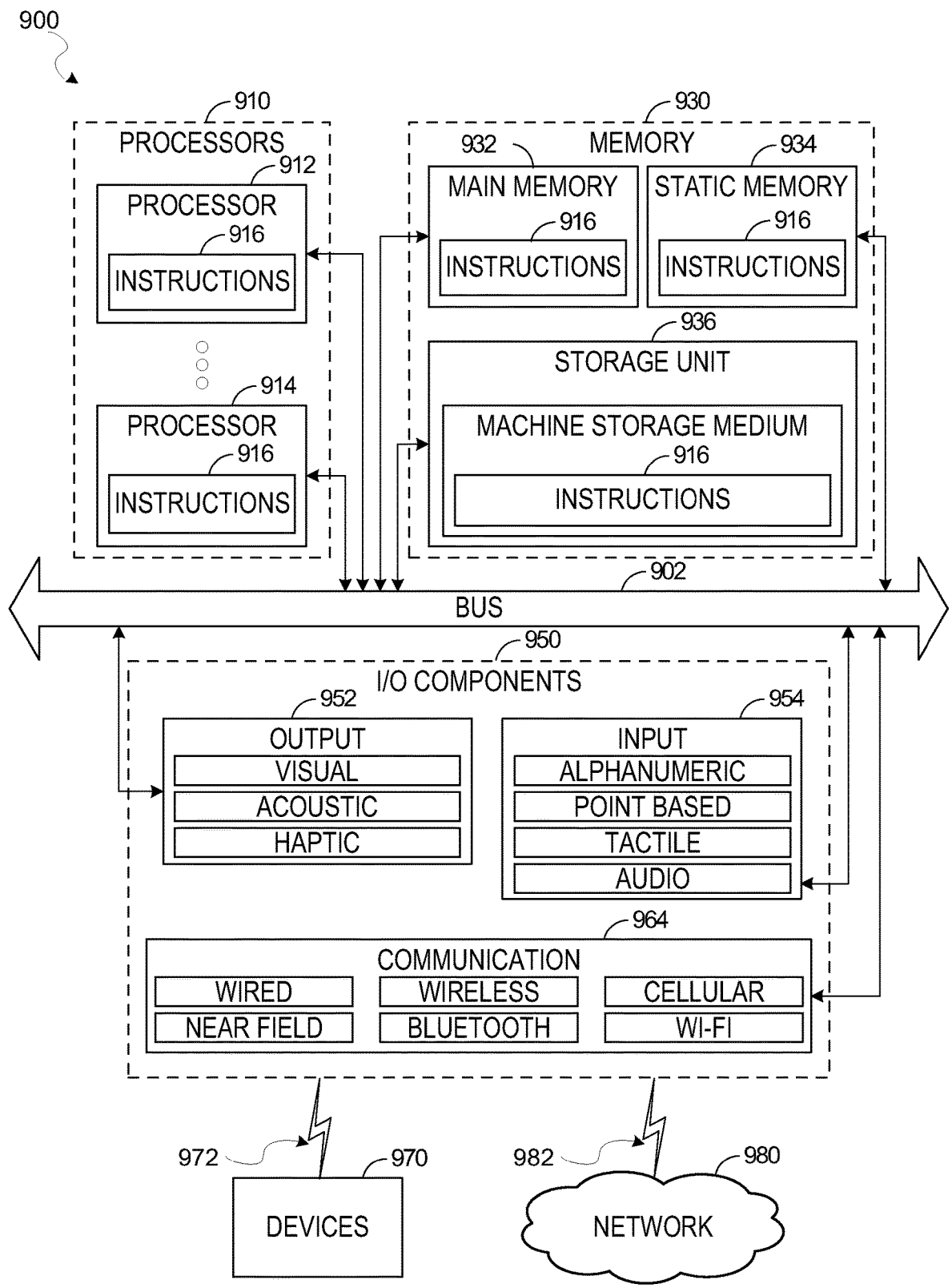
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the remote computing device 106, the access management system 118, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 118, the compute service manager 112, the execution platform 114, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-topeer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: in response to receiving a show command, performing a plurality of navigation steps, each navigation step corresponding to a different layer in a database structure and each navigation step including an operator to fetch items from a metadata database, the performing of the plurality of navigation steps including: in a first navigation step, fetching a first set of objects in a first layer of the database structure up to a first bounded limit; and in a second navigation step, fetching a second set of objects in a second layer of the database structure corresponding to the first set of objects in the first layer up to a second bounded limit; fetching dependency information associated with the second set of objects; and compiling the dependency information associated with the second set of objects and generating results corresponding to the second set of objects.

Example 2. The method of example 2, further comprising: fetching a third set of objects using the second navigation step in the second layer of the database structure corresponding to the first set of objects up in the first layer to a second bounded limit; fetching dependency information associated with the third set of objects; and compiling the dependency information associated with the third set of objects and generating results corresponding to the third set of objects.

Example 3. The method of any of examples 1-2, further comprising: flushing memory used by the second navigation step.

Example 4. The method of any of examples 1-3, wherein the dependency information associated with the second set of objects is fetched in a single transaction with the metadata database using bulk reads.

Example 5. The method of any of examples 1-4, wherein the dependency information associated with the third set of objects is fetched in the single transaction with the metadata database using bulk reads.

Example 6. The method of any of examples 1-5, wherein execution of the show command is stopped before all objects corresponding to the show command in the first layer are fetched, and a bookmark is placed indicating where the show command was stopped.

Example 7. The method of any of examples 1-6, further comprising: executing a second show command based on the bookmark.

Example 8. The method of any of examples 1-7, further comprising: collecting metrics associated with each navigation step at a centralized location.

Example 9. The method of any of examples 1-8, wherein the metrics include time spent fetching objects in each navigation step.

Example 10. The method of any of examples 1-9, further comprising: collecting metrics associated with fetching dependency information.

Example 11. A system comprising: one or more processors of a machine; and a memory storing instructions that, when executed by the one or more processors, cause the machine to perform operations implementing any one of example methods 1 to 10.

Example 12. A machine-readable storage device embodying instructions that, when executed by a machine, cause the machine to perform operations implementing any one of example methods 1 to 10.

The invention claimed is:

1. A method comprising:
   receiving a first show command;
   in response to the first show command, initiate fetching a first set of first layer objects in a first layer of a metadata database;
   stopping execution of the first show command before all objects in the first set of first layer objects are fetched;
   inserting a bookmark indicating where the first show command was stopped in relation to fetching the first set of objects;
   receiving a second show command;
   in response to the second show command, retrieving the bookmark and fetching remaining objects in the first set of first layer objects in the first layer of the metadata database up to a first bounded limit using a first memory space;
   fetching a first set of second layer objects in a second layer of the metadata database corresponding to the first set of first layer objects in the first layer up to a second bounded limit using a second memory space;
   fetching dependency information associated with the first set of second layer objects;
   flushing the second memory space;
   fetching a second set of second layer objects in the second layer of the of the metadata database corresponding to the first set of first layer objects in the first layer up to the second bounded limit using the flushed second memory space;
   fetching dependency information associated with the second set of second layer objects;
   compiling dependency information associated with the first and second sets of second layer objects; and
   generating results for the second show command based on the compiled dependency information.

2. The method of claim 1, wherein the dependency information associated the first set of second layer objects is fetched in a single transaction with the metadata database using bulk reads.

3. The method of claim 1, wherein the dependency information associated the second set of second layer objects is fetched in a single transaction with the metadata database using bulk reads.

4. The method of claim 1, further comprising:
   determining that there are additional second layer objects corresponding to the first set of first layer objects; and
   in response to determining that there are more second layer objects, flushing the second memory space.

5. The method of claim 1, further comprising:
   collecting metrics associated with each navigation step at a centralized location.

6. The method of claim 5, wherein the metrics include time spent fetching objects in each navigation step.

7. The method of claim 1, further comprising:
   collecting metrics associated with fetching dependency information.

8. A machine-storage medium embodying instructions that, when executed by a machine, cause the machine to perform operations comprising:
   receiving a first show command;
   in response to the first show command, initiate fetching a first set of first layer objects in a first layer of a metadata database;
   stopping execution of the first show command before all objects in the first set of first layer objects are fetched;
   inserting a bookmark indicating where the first show command was stopped in relation to fetching the first set of objects;
   receiving a second show command;
   in response to the second show command, retrieving the bookmark and fetching remaining objects in the first set of first layer objects in the first layer of the metadata database up to a first bounded limit using a first memory space;
   fetching a first set of second layer objects in a second layer of the metadata database corresponding to the first set of first layer objects in the first layer up to a second bounded limit using a second memory space;
   fetching dependency information associated with the first set of second layer objects;
   flushing the second memory space;
   fetching a second set of second layer objects in the second layer of the of the metadata database corresponding to the first set of first layer objects in the first layer up to the second bounded limit using the flushed second memory space;
   fetching dependency information associated with the second set of second layer objects;
   compiling dependency information associated with the first and second sets of second layer objects; and
   generating results for the second show command based on the compiled dependency information.

9. The machine-storage medium of claim 8, wherein the dependency information associated the first set of second layer objects is fetched in a single transaction with the metadata database using bulk reads.

10. The machine-storage medium of claim 8, wherein the dependency information associated the second set of second layer objects is fetched in a single transaction with the metadata database using bulk reads.

11. The machine-storage medium of claim 8, further comprising:
    determining that there are additional second layer objects corresponding to the first set of first layer objects; and
    in response to determining that there are more second layer objects, flushing the second memory space.

12. The machine-storage medium of claim 8, further comprising:
    collecting metrics associated with each navigation step at a centralized location.

13. The machine-storage medium of claim 12, wherein the metrics include time spent fetching objects in each navigation step.

14. The machine-storage medium of claim 8, further comprising:
  collecting metrics associated with fetching dependency information.

15. A system comprising:
  at least one hardware processor; and
  at least one memory storing instructions that, when executed by the at least one hardware processor, cause the at least one hardware processor to perform operations comprising:
  receiving a first show command;
  in response to the first show command, initiate fetching a first set of first layer objects in a first layer of a metadata database;
  stopping execution of the first show command before all objects in the first set of first layer objects are fetched;
  inserting a bookmark indicating where the first show command was stopped in relation to fetching the first set of objects;
  receiving a second show command;
  in response to the second show command, retrieving the bookmark and fetching remaining objects in the first set of first layer objects in the first layer of the metadata database up to a first bounded limit using a first memory space;
  fetching a first set of second layer objects in a second layer of the metadata database corresponding to the first set of first layer objects in the first layer up to a second bounded limit using a second memory space;
  fetching dependency information associated with the first set of second layer objects;
  flushing the second memory space;
  fetching a second set of second layer objects in the second layer of the of the metadata database corresponding to the first set of first layer objects in the first layer up to the second bounded limit using the flushed second memory space;
  fetching dependency information associated with the second set of second layer objects;
  compiling dependency information associated with the first and second sets of second layer objects; and
  generating results for the second show command based on the compiled dependency information.

16. The system of claim 15, wherein the dependency information associated the first set of second layer objects is fetched in a single transaction with the metadata database using bulk reads.

17. The system of claim 15, wherein the dependency information associated the second set of second layer objects is fetched in a single transaction with the metadata database using bulk reads.

18. The system of claim 15, the operations further comprising:
  determining that there are additional second layer objects corresponding to the first set of first layer objects; and
  in response to determining that there are more second layer objects, flushing the second memory space.

19. The system of claim 15, the operations further comprising:
  collecting metrics associated with each navigation step at a centralized location.

20. The system of claim 19, wherein the metrics include time spent fetching objects in each navigation step.

21. The system of claim 15, the operations further comprising:
  collecting metrics associated with fetching dependency information.

* * * * *